United States Patent [19]

Carley

[11] 4,314,263
[45] Feb. 2, 1982

[54] FLUID JET APPARATUS

[76] Inventor: Adam L. Carley, Westside Dr., Atkinson, N.H. 03811

[21] Appl. No.: 169,815

[22] Filed: Jul. 17, 1980

[51] Int. Cl.³ ............................................ G01D 15/18
[52] U.S. Cl. ................................... 346/140 R; 346/75
[58] Field of Search ............... 346/75, 140 R, 140 PD

[56] References Cited

U.S. PATENT DOCUMENTS

| | | | |
|---|---|---|---|
| 3,375,528 | 3/1968 | Klavsons et al. | 346/140 PD |
| 3,480,962 | 11/1969 | Weigl et al. | 346/140 PD X |
| 3,553,719 | 1/1971 | Miyazaki | 346/140 PD |
| 3,693,179 | 9/1972 | Skala | 346/140 PD X |
| 3,790,703 | 2/1974 | Carley | 346/140 R X |
| 3,864,696 | 2/1975 | Fischbeck | 346/140 PD |
| 3,925,790 | 12/1975 | Fischbeck | 346/140 PD |
| 4,164,745 | 8/1979 | Cielo et al. | 346/140 PD |
| 4,263,601 | 4/1981 | Nishimura et al. | 346/140 R X |

*Primary Examiner*—George H. Miller, Jr.

*Attorney, Agent, or Firm*—Thompson, Birch, Gauthier & Samuels

[57] ABSTRACT

Apparatus for directing a jet of fluid at a target to deposit a desired image thereon. The apparatus employs a nozzle with a pointed nozzle nib, a supply of fluid for the nozzle, and a pressure regulator controlling the pressure of the fluid at the nozzle upstream of the nib. The jet of fluid is accelerated from the nozzle nib and caused to flow to the target by the creation of an electric field in the region between the nozzle and the target. The fluid jet is substantially prevented from breaking up into droplets during flight by a combination of techniques so that the fluid flows to the target as a solid liquid filament or as a stream of mist-size droplets which are so small and so closely spaced that they behave like a solid liquid filament. The amplitude of the fluid flow is continuously modulated in response to an information signal by fluid surface pumping action or other means to produce the desired fluid image on the target.

149 Claims, 10 Drawing Figures

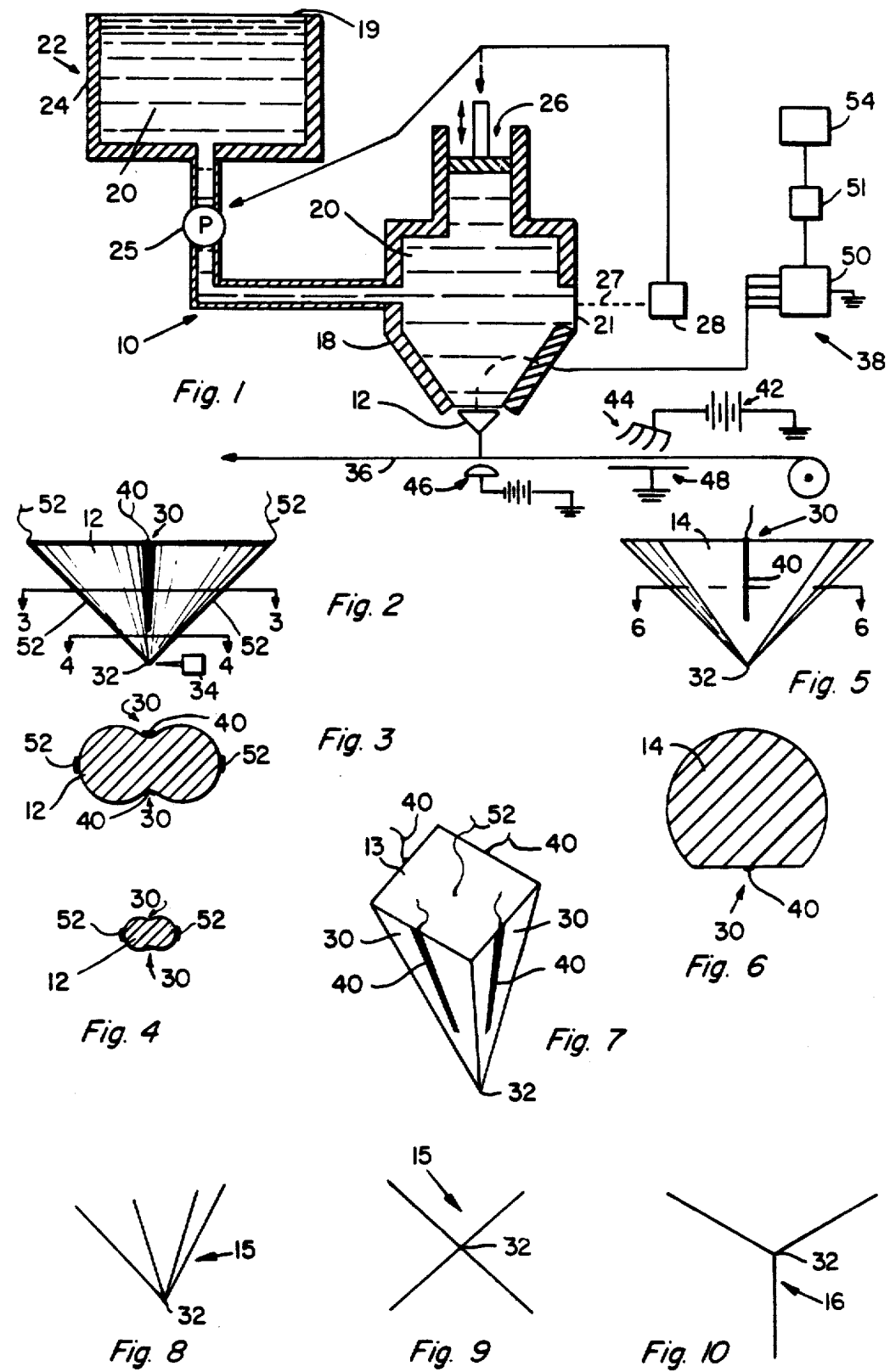

FLUID JET APPARATUS

BACKGROUND OF THE INVENTION

In the past, there have been many devices for causing a jet of ink to flow onto a paper target. For example, U.S. Pat. No. 3,060,429 issued to Teletype Corporation on Oct. 23, 1962. In the Teletype patent, a positive pressure is applied to the ink upstream of the nozzle. The nozzle is a simple round orifice or aperture. An electric field is impressed between the nozzle and the paper target to cause the ink to flow to the paper. Various plates or valves are disposed between the nozzle and the target and operate in response to control means to turn the ink flow on or off.

An improvement on the Teletype style nozzle in U.S. Pat. No. 3,886,565 issued on May 27, 1975 to Tokyo Shibaura Electric Co., Ltd. The Tokyo Shibaura patent shows an apertured nozzle which has a sharp extended point formed on a downstream lip portion. The ink is acted upon by a positive upstream pressure.

The well-known conventional IBM 6640 ink jet printer system is described in the April, 1979 issue of Scientific American, p. 162 ("Ink Jet Printing"). This system uses an apertured nozzle and directs an ink stream composed of relatively large droplets towards the target. A gutter between the nozzle and the target is used to intercept approximately 98% of the ink droplets before they hit the target. The intercepted ink is recirculated to the ink supply. These prior art devices (and other prior art devices known to applicant) do not achieve the following goals that applicant's invention achieves:

(a) to deposit a sharp image on the target by substantially suppressing the ink jet stream from turning into relatively large ink droplets.

(b) to deposit an image on the target which has a gray scale by directly modulating the amplitude (i.e. flow rate) of the ink jet.

(c) to permit a large number of nozzles to be used in close proximity to each other and to the target by eliminating all implements or structures between the nozzles and the target, and by preventing electrical interference between nozzles.

SUMMARY OF THE INVENTION

This invention is a fluid jet apparatus for directing a stream of fluid (such as ink) towards a target (such as a moving web of paper) and controlling that stream so that it deposits the desired fluid images on the target. This invention is broad in concept and has many possible embodiments.

The preferred embodiment of the fluid jet apparatus utilizes a nozzle means that has a sharp nozzle nib (or tip). The apparatus does not utilize a conventional apertured nozzle. Instead, the preferred nozzle nib has a sharpened point from which the fluid accelerates.

The nozzle is kept constantly supplied with fluid (such as ink) by a fluid supply which preferably has a plenum chamber immediately upstream of the nozzle. A pressure means regulates and maintains constant the fluid pressure in the plenum chamber upstream of the nozzle. In the absence of other flow-causing means, the fluid will not flow out of the nozzle or will not have any significant flow.

A target, such as a moving web of paper, film, plastic, fabric, etc. or such as a stationary sheet of paper, an integrated circuit chip, etc., is spaced from the nozzle (or nozzles). The spacing is preferably quite close.

An electrical circuit is provided for producing an electric field in the region between the nozzle and the target. The circuit charges the fluid and oppositely charges the target so that the fluid accelerates from the nozzle and flows to the target.

Various means are used to substantially suppress the fluid filament (which leaves the nozzle) from breaking up into relatively large fluid droplets. Preferably, the fluid does not break up at all, or breaks up into a stream of closely spaced, extremely small droplets which act as if they were still a fluid filament. The various suppression means include providing the fluid with selected levels of viscosity, surface tension, density, and electrical conductivity.

In order to achieve a gray scale on the target, a means is provided for continuously and quickly modulating the amplitude or flow rate of the fluid over the entire flow rate range of from zero to a maximum. This is quite different from simple on-off modulation which is also possible with this apparatus. This full range flow rate modulation capability permits the fluid to be deposited on the target as an extremely high quality image.

Finally, an information signal reception means is provided for controlling the fluid modulating means. The information signal can take many different forms.

This invention is intended to be used as a basis of a very wide variety of applications. A few examples are a silent typewriter, a printing press for newspapers, magazines, or books, an instant still camera with plain paper "film", a facsimile copy transmission machine, and an integrated circuit fabricating machine.

DESCRIPTION OF THE DRAWINGS

FIG. 1 is a schematic diagram of the preferred embodiment of the fluid jet apparatus of this invention in which the fluid is ink, one nozzle is shown, and the target is a moving web of paper.

FIG. 2 is a side elevational view of a "dual cone" nozzle having two fluid flow channels. One channel is shown.

FIG. 3 is a sectional view of the "dual cone" nozzle taken along line 3—3 of FIG. 2, both fluid flow channels being shown.

FIG. 4 is a sectional view of the "dual cone" nozzle taken along line 4—4 of FIG. 2.

FIG. 5 is a side elevational view of a "single cone" nozzle having a single flat fluid flow channel.

FIG. 6 is a sectional view of the "single cone" nozzle taken along line 6—6 of FIG. 5.

FIG. 7 is a perspective view of a solid pyramid nozzle.

FIG. 8 is a perspective view of an open-sided hollow pyramid nozzle.

FIG. 9 is a bottom plan view of the four wire pyramid nozzle shown in FIG. 8.

FIG. 10 is a bottom plan view of a three wire pyramid nozzle similar to that shown in FIG. 8, but having one wire fewer.

DESCRIPTION OF THE PREFERRED EMBODIMENT

FIG. 1 shows a schematic diagram of the fluid jet apparatus 10. The preferred "dual cone" nozzle means 12 is shown in FIGS. 2-4. Alternative embodiments of the nozzle means are the "single cone" nozzle 14 (FIGS. 5-6), the solid pyramid 13 (FIG. 7), the four wire pyramid 15 (FIGS. 8–9) and the three wire pyramid 16 (FIG. 10).

Referring again to FIG. 1, nozzle means 12 protrudes from fluid plenum 18 which is otherwise closed to the atmosphere. Plenum 18 is maintained full or substantially full of fluid 20 by a fluid supply means 22. Supply means 22 feeds fluid directly into the large diameter plenum 18 which is upstream of nozzle 12.

The reservoir 24 of fluid supply means 22 is normally sealed, as by a bladder 19, to isolate the fluid from the surrounding atmosphere. Alternatively, the reservoir 24 could be open to the atmosphere. Pump 25 feeds fluid 20 from reservoir 24 to plenum 18 which creates very little fluid flow resistance because of the latter's relatively large diameter.

Fluid Pressure

The pressure of fluid 20 at the point where the fluid leaves the plenum and enters the channels of nozzle 12 is a very important parameter of the system. The fluid pressure at all points in plenum 18 is the same, except for hydrostatic head, as at the entrance of nozzle 12. Therefore, the pressure at the entrance to the nozzle can be measured and regulated from anywhere in the plenum. A pressure regulator 26 (usually including a transducer) is provided for regulating and maintaining constant the fluid pressure in the plenum upstream of nozzle 12 in order to maintain constant the fluid pressure at the nozzle. Pressure regulator 26 can take many forms and the selected constant fluid pressure in the nozzle is normally such that, in the absence of other means acting on the fluid, no fluid or a negligible amount of fluid will flow from the nozzle 12. The selected constant fluid pressure in the nozzle can be slightly less than, or slightly more than, or exactly atmospheric pressure, depending on many other factors, such as the fluid's characteristics and the apparatus' physical geometry and characteristics.

There are numerous ways to regulate and maintain the presence of the fluid upstream of the nozzle. Besides the piston means shown in FIG. 1, one way is to utilize a piezo-electric or an electro-magnetic transducer means. Another way is to use a pump. Another way is to utilize an electro-mechanical valve means. Any of these means for regulating the fluid pressure could be assisted by fluidic amplification. A way to minimize fluid pressure variances is to pump the fluid to continuously circulate it in the plenum.

Consumption of the fluid, the action of pump 25, and other factors acting on the entire system, including atmospheric pressure changes, can cause the fluid pressure to vary. Therefore, it is desirable to provide a feedback loop including a flexible diaphragm 21, a diaphragm position sensor 27, and a regulator control 28 to sense changes in pressure and to cause the pressure regulator 26 to compensate. By this means, the fluid pressure can be maintained at the selected constant level. The position of the diaphragm can be sensed electrically by making the diaphragm one plate of a capacitor. Other conventional pressure sensing means can also be used.

Whether the fluid pressure is maintained positive, negative or atmospheric depends on the type of fluid flow amplitude modulating means used and the nature of the system performance sought. One modulating means, the subsequently described thermal means for modifying viscosity, requires relatively high positive fluid pressure, but still prevents all but negligible fluid flow from the nozzle in the absence of the action of supplemental flow causing means (e.g. heating the fluid). Negligible fluid flow has a negligible effect on the target. For example, if the fluid was black ink, and the target was paper, and the resultant image on the target was invisible, the flow would be considered to be negligible. Another fluid flow amplitude modulating means, such as the subsequently described main field modulating means, requires negative fluid pressure for optimum results.

The major purpose of plenum 18 is to provide a fluid conduit of maximum cross-sectional area immediately upstream of the nozzle. Such a maximum cross-section minimizes fluid velocity upstream of the nozzle and also minimizes any upstream fluid pressure drop caused by viscous drag. Such a pressure drop tends to decrease sensitivity to fluid flow modulation except for viscosity modulation by thermal means. Where the prior art (e.g. U.S. Pat. No. 3,886,565 to Tokyo Shibaura) had no plenum, the prior art apparatus appears to have produced significant viscous back pressure.

It should be understood that pump 25, diaphragm 21, regulator control 28, regulator 26, and the entire geometry shown in FIG. 1 are schematic and would probably have a different appearance and location in an actual system. For example, the pump could be replaced by a gravity feed arrangement. The feedback could be mechanical/hydrostatic or electronic or incorporated into the voltage modulating means 50 (to be subsequently described).

The Nozzle Means

The nozzle 12 shown in FIGS. 2–4 is relatively straight-forward to fabricate. It can have one fluid flow channel 30 or two (as shown in FIGS. 2–4), or four, or virtually any other number. The nozzle is preferably integral with and protrudes from the plenum 18. Alternatively, the apparatus can include means for retracting the nozzle into the plenum. Channels 30 are open and on the exterior surface of the nozzle as opposed to being tubular or closed. Each channel becomes narrower and shallower as it approaches the conical nozzle tip 32. Each channel is free of constrictions and narrow portoins so that foreign matter in the fluid does not become lodged in the channel.

The "dual cone" nozzle 12 shown in FIGS. 2–4 consists of two right cones which are butted together and fused along their adjacent vertical sides. The fused areas are filled in to provide two concave flow channels 30. Each channel becomes narrower and shallower as it approaches the nozzle tip or nib 32.

Preferably, nozzle 12 is affixed to and protrudes from plenum 18 with a gap therebetween so that fluid 20 continuously flows from the plenum and fills the nozzle's exterior channels 30 right down to the nozzle nib 32. Nib 32 has a structural point at its downstream terminus and the point is preferably very sharp. The sharp point (which is not absolutely required) is usually located on the nozzle's central axis. As used here, a sharp point means precision under high magnification, not a small angle.

One of the purposes of having more than one fluid channel 30 is to accommodate the use of more than one type of fluid, such as multiple colors, multiple viscosities, and other multiple properties or characteristics. The different fluids flowing down the different grooves merge at the tip and become a single flowing filament.

Although the foregoing description of nozzle 12 has been in terms of a single nozzle, this invention is capable of utilizing a multiplicity of closely grouped similar nozzles to product substantially parallel fluid jets. For example, a row of approximately ten to thirty nozzles could be used to "type" a line of text a letter at a time across the page in the same way that a conventional typewriter does now. Or a row of approximately one thousand nozzles could be used to span the width of the page and to print a line of text a line at a time down the page in the same way that a few very high speed printers do now. The nozzles could also be disposed in a plurality of rows, or disposed vertically with respect to each other with their axes horizontal. The nozzles could also be disposed in two rows, each row having channels carrying two different colored inks to produce four color process-color printing.

Although the cross-sectional shape of channel 30 usually constitutes a depressed or cut-out portion, as shown in FIGS. 3-4, the channel could also be defined by surface chemistry. That is, the surface of the channel is capable of being wetted by the fluid, but is not depressed beneath the plane of the adjacent nozzle surface (which is incapable of being wetted by the fluid). Because of the surface chemistry, the fluid remains in the channel. FIGS. 5 and 6 show a "single cone" embodiment 14 which has a round exterior surface and a flat, non-depressed channel 30 which could possibly be further defined by surface chemistry, i.e. wettable by the fluid. Such a flat channel may be fabricated in a crystalline substance by etching a crystal along a selected crystallographic plane. Such crystal etching would also be useful for other nib geometries.

FIG. 7 shows a solid pyramidal nozzle 13 in which all of the fluid flows on the exterior surface. The pyramid can have either a rectangular or a triangular base. The channels 30 are defined by the triangular sides of the pyramid. Because the nozzle is solid, at least one surface pumping electrode would have to be internal and exposed only at the downstream tip of the nib 32. This will be more fully explained subsequently.

FIGS. 8-10 show two alternative nozzle designs. In theory, these open-sided hollow pyramids are superior to the "dual cone" nozzle because they present less physical resistance to the fluid flow. However, these pyramids have shown a tendency to become fouled with foreign matter at their pointed apexes. Perhaps, upstream fluid filters and/or nozzle tip cleaning mechanisms can overcome this fouling tendency.

FIGS. 8-9 show a four wire pyramid 15 within which the fluid flows down the interior. The surface tension of the fluid maintains the fluid within the pyramid all the way down to the sharp, pointed nozzle tip 32. FIG. 10 shows a three wire pyramid 16 which is similar in all respects to the four wire pyramid 15 except that it has one wire fewer. The pyramid wires have an extremely small diameter so that they do not significantly impede the downstream fluid flow, even at nozzle tip 32.

In order to prevent foreign matter from fouling nozzle tip 32, a nozzle tip cleaning unit 34 has been schematically shown in FIG. 2 adjacent to nozzle tip 32. Cleaning unit 34 can take various forms such as an electrical heater for incinerating foreign matter or a chemical applicator for dissolving foreign matter. The cleaning unit could include a continuously operating means for detecting foreign matter at tip 32, and for automatically activating the cleaning unit when fluid flow from the nozzle has become impaired. It will be understood that cleaning unit 34 is shown to the side of the nozzle for schematic purposes. It would typically be integral with or located within the nozzle-plenum assembly. As an example, the cleaning unit could wipe the nozzle clean as the nozzle is retracted into the plenum when not in use.

The Fluid

The fluid 20 can take various forms. In the preferred embodiment, it is usually ink of various colors or transparent. It can alternatively be dye or paint or a chemical agent which exposes resist of the type used in the masking step of the fabrication of integrated circuit semiconductor chips, or other types of fluids. The fluid can be Newtonian (i.e. conventional) or thixotropic (i.e. low viscosity while undergoing shear at the nib, but higher viscosity in flight). A Newtonian fluid which has been successfully used in laboratory tests in a 50/50 mixture of anhydrous isopropyl alcohol, and very light silicone oil (Dow 200 having a 1 CPS viscosity).

The Target

FIG. 1 shows a target 36 onto which fluid 20 is deposited. The shown target is a moving web of plain paper. The possible types of targets which could be used in this invention are almost without limit. Examples include paper, film, fabric, metal, plastic, glass, semiconductor substrates, thin film substrates, and virtually any material capable of receiving a fluid image. The target can be treated with a fluid repellant to reduce image bleeding. The target can be stationary or moving. The nozzle 12 can be stationary or moving. But any nozzle-target relative movement should not change the spacing between the nozzle and the target as measured along the nozzle axis perpendicular to the plane of the target. Preferably, the spacing between nozzle tip 32 and target 36 should be as close as is practically possible without the occurrence of electric field distortion due to irregularities in the surface of the target, or the target's physically contacting the nozzle tip. The nozzle axis should preferably by perpendicular to the plane (or the tangent) of the target at the point where the nozzle axis intersects the target.

The target 36 can be a relatively good electrical conductor or a relatively good electrical insulator. It can also be a relatively poor electrical conductor. However, the target is preferably a carefully specified relatively poor conductor which permits greater tolerance in the specifications of the other components of the system. For example, if the target's conductivity is too high, the fluid's conductivity must be quite low. The target can also be a semiconductor. It can be treated with an antistatic agent to increase its electrical conductivity.

One of the advantages of this invention is that it requires no implements or electrodes or equipment of any kind between the nozzle and the target. This means that the nozzle can be positioned extremely close to the target which is highly desirable for fluid droplet suppression purposes, as will be more fully described subsequently.

Fluid Jet Acceleration and Flight

To accelerate the fluid off the nozzle 12, and to a certain extent to suppress breakup into droplets, a means 38 is provided for producing an electric field between the nozzle means and the target 36. Electric field producing means 38 can (in cooperation with an additional modulating signal) cause a significant volume of fluid 20 to overcome the surface tension of the fluid at the nozzle and to initially accelerate from nozzle nib 32 and to flow to target 36. After reaching the target, the fluid forms a usable image on the target.

There are many ways to produce an electric field in the region between the nozzle tip and the target depending on target conductivity. In the embodiment shown in FIG. 1, an electrical circuit is provided which is quite simple. An electrode 40 is affixed to the bottom of at least one fluid flow groove 30 on nozzle 12 which is an insulator. Such electrodes are shown in FIGS. 2-3 and 5-8. The electrodes do not have to extend to the nozzle tip. They simple need to be long enough and wide enough to electrically contact the fluid as it flows along the channels. The fluid itself, being weakly conducting, effectively "extends" the electrode to the nozzle tip 32. Each electrode 40 is electrically connected to a voltage signal source 50. A separate DC voltage source 42 typically produces 1200 to 2500 volts and is electrically connected to a means for charging the target with a charge opposite that of the fluid. If the target is at least partially conducting, a wire brush 44 produces satisfactory charging results. When the wire brush is used in combination with a ground 48, the target can be an insulator. Alternatively, a corona discharge device can be used instead of the wire brush to charge the paper. In this arrangement, higher voltage are required. A stabilization electrode 46 may be required to maintain precise field levels if the target is not a good conductor.

The zero or off level of voltage source 50 should be selected to cooperate with the selected pressure maintained by the pressure-regulator means 26 such that the fluid 20 is charged by electrode 40 and fills the nozzle channel 30 all the way to nozzle tip 32 but does not leave the tip despite the existence of the electric field created between nozzle 12 and target 36. That is, the downstream pull of the electric field produced by the electrical circuit, as just described, counter-balances the upstream pull of the fluid pressure and/or the voltage source 50 in their mutual effects on the fluid which is therefore held motionless on the nozzle, or which is restricted to a negligible flow rate.

There are other ways to charge the fluid and to oppositely charge the target. Various types and locations of electrodes or other charge depositing devices can be used to charge the fluid. The target can be charged by various types and locations of electrodes or other charge depositing devices in contact with or positioned near to the target. In fact, certain types of targets need not even be charged directly if the target passes through the electric field created between the nozzle and an electrode 46 mounted behind the target.

By increasing the strength of the electric field between the nozzle and the target to a strength level above that at zero flow, or by increasing fluid pressure, or by increasing the voltage from voltage source 50, increasing quantities of fluid can be made to flow past and accelerate from the point of the nozzle tip 32 and to thereafter flow to the target approximately along an electric field line. This is usually the most central field line. Preferably, the fluid 20 leaps the nozzle-target gap in the form of a solid filament and remains essentially solid all the way across the gap. It must be realized that this invention concerns microscopic dimensions. Typically, the fluid filament has a diameter of approximately 2 to 5 microns. Typically, it has a terminal velocity of approximately 5 to 15 meters per second. If the fluid filament does not remain solid all the way across the gap, it generally breaks up into a stream of closely spaced, extremely small droplets having a diameter of less than 4 microns. Such a stream behaves like a solid fluid filament for all purposes which are important to this invention. An important purpose is that irregularities in the fluid flow, if any, such as droplets, be so small as to be invisible on the target at all flow rates. Another important purpose is that substantially all of the fluid must reach the target. The only significant loss of fluid should be caused by evaporation. Another important purpose is that the fluid flow in a straight line. When the fluid flow becomes a stream of closely spaced droplets, the droplet size decreases and droplet frequency increases as the fluid flow rate decreases.

The field which is produced in the region between the nozzle and the target to accelerate the fluid jet from the nozzle to flow to the target is preferably an electric field. Alternatively, the field may be a magnetic field gradient parallel to the fluid jet. This gradient can, for example, be created by a permanent magnet gap located behind the target. The fluid includes magnetic particles and is accelerated by the gradient from the nozzle to the target. Such magnetic gradient acceleration is quite different from magnetic field gradient deflection of a fluid jet which is an old idea. The present invention involves the magnetic gradient's being parallel to the fluid jet. The prior art shows the magnetic gradient's being perpendicular to the fluid jet.

A second alternative type of field is a centrifugal (i.e. inertial) force field which is used to centrifugally accelerate the fluid from the nozzle. For example, the entire nozzle-plenum assembly may be rapidly spun about an axis which is substantially parallel to the tangential plane of the target. More precisely, the target could be a portion of a helix, the nozzle could be located within the helix and spun about the helix axis. The nozzle extends radially outwardly and, when spun, causes the fluid to accelerate radially outwardly to the inside of the helical target. This is the approximate way that a spinning head video tape recorder operates. It will also be understood that one, two, or all three of these field producing means may be used together.

Suppressing Breakup into Droplets

In order to ensure that the fluid is or behaves like a solid filament, various means are provided which cooperate to substantially suppress breakup into droplets of the fluid flow. Such suppression means are a combination of providing the fluid with certain characteristics and/or acting on the fluid in certain ways. All such suppression means may affect and may be affected by other suppression means and other properties and characteristics of the entire system. Examples of the various suppression means include:

(a) creating an electric field normal to the surface of the fluid flow in flight which field is sufficiently strong to minimize the surface tension-induced internal pressure of the fluid flow.

(b) providing the fluid with a surface tension which is sufficiently low to prevent breakup at the inception of flight into droplets at the existing field strength level.

(c) providing the fluid with a viscosity which is sufficiently high to prevent breakup into droplets and which is sufficiently low to permit effective modulation of the amplitude of the fluid flow.

(d) providing the fluid with thixotropic or electroviscous characteristics.

(e) providing the fluid with a density which is sufficiently high that fluid inertia prevents breakup into droplets.

(f) providing the fluid with a sufficiently high electrical conductivity to establish substantial electrostatic equilibrium within the fluid, and with a sufficiently low electrical conductivity to prevent explosion of the fluid flow.

(g) providing a sufficiently strong main electric field and thereby a sufficiently high fluid surface charge.

(h) maximizing the fluid flow velocity and thereby reducing the transit time which elapses from the time the fluid jet leaves the nozzle nib and the time the fluid arrives at the target.

(i) providing the nozzle nib with a downstream point of sufficient sharpness that fluid droplets are immediately formed therefrom which have a diameter that is smaller than a size which can be perceived by the human eye in the image on the target, or which similarly degrade the image in applications not involving direct viewing.

(j) providing at least one in-flight electrode closely spaced from the fluid jet to affect the electric field, and to stabilize the filament. Such an electrode could be the target itself.

(k) incorporating a surface-active agent into the fluid.

(l) incorporating magnetic particles into the fluid so that the fluid can be accelerated magnetically to increase its velocity.

(m) directing an air flow parallel to the fluid flow to decrease fluid surface drag and to increase the velocity of fluid flow.

(n) orienting the nozzles so that the fluid flow is generally downward to utilize the force of gravity to increase the velocity of fluid flow.

(o) cooling the fluid during flight, or heating the fluid poor to flight, to increase viscosity in flight.

(p) polymerizing a constituent of the fluid during flight to increase viscosity in flight.

These fluid droplet suppressing means must be carefully selected not only to achieve maximum droplet suppression, but also in recognition that certain fluid flow rate amplitude modulating means or applications of the fluid jet apparatus may require compromising the maximum droplet suppression parameters to achieve other purposes. The foregoing list of droplet suppression means includes many variables. It must be understood that no one of these means is necessary to achieve substantial droplet suppression, and that no particular value or range of values for any variable is for the most part required. This invention achieves substantial droplet suppression by using one or more of the listed suppression means as dictated by the given application and system specifications.

For example, the sharply pointed nib aids in droplet suppression when the flow rate is low and no fluid filament is produced at all. The pointed nib also provides a platform for surface pumping. In contrast, at high flow rates where no surface pumping is used (e.g. an off-on application), no pointed nib is necessary.

It is believed that the prior art does not disclose effective droplet suppression in the context of the present invention, and therefore does not produce a satisfactory gray scale in the image on the target. Most of the prior art deals with off-on modulation or individual droplet manipulation. This invention does not manipulate individual droplets, but this invention does include off-on modulation. The use of any of the subsequently described fluid flow amplitude modulation means in combination with the previously described droplet suppression means on an off-on apparatus will result in a significant performance improvement.

Just as no one of the droplet suppression means is necessary, no one of these means is likely to be sufficient. The only possible exception might be providing the fluid with an extremely high fluid viscosity which is quite impractical.

For example, the Tokyo Shibaura U.S. Pat. No. 3,886,565 discloses a pointed nib and the use of an oil-based fluid. Such a fluid would have a very low electrical conductivity and, coacting with the pointed nib, would not produce substantial droplet suppression. Therefore, such an apparatus could not produce a usable gray scale and would be confined to on-off operation. Furthermore, such an apparatus does not have a plenum immediately upstream of the nozzle, and does require the use of positive pressure, both features which degrade the performance of the apparatus. It is strongly believed that the prior art does not show or suggest substantial droplet suppression in combination with continuous fluid flow amplitude modulation.

Modulating the Amplitude of the Fluid Flow

So far, the fluid jet apparatus of this invention has been described as having a nozzle which is kept supplied with fluid. The pressure conditions in the fluid at the nozzle means are maintained constant so that substantially no fluid flows from the nozzle nib in the absense of additional flow causing means. A target is closely spaced from the nozzle. A field between the nozzle nib and the target is created which causes the fluid to initially accelerate from the nozzle nib and to fly to the target in filament-like form to produce an image on the target. Various means are employed to substantially prevent the fluid jet from breaking up into droplets. Now, the means by which the amplitude of the fluid flow is modulated will be described in detail.

It should be understood that the fluid flow amplitude cannot be successfully modulated in a smooth and precise manner unless the fluid jet has a substantially solid filament form or at least acts as if it had one. Therefore, droplet suppression is a prerequisite for effective amplitude modulation. As used here, amplitude modulation is intended to mean varying the fluid flow rate in a smooth and continuously variable manner over the entire range of possible flow rates from substantially zero to a maximum. The amplitude modulation means preferably responds continuously in frequency from zero to a maximum including all frequencies therebetween. Unless fluid droplets are suppressed, only on-off modulation is usually possible. With the fluid droplet suppression, full range amplitude modulation is possible and this capability facilitates the production of photographic quality images (i.e. having a gray scale) on the target.

There are several different means for modulating the amplitude of the fluid flow. The simplest means is varying the strength of the electric field between the nozzle and the target. Referring to FIGS. 1-4, this is accomplished by causing voltage signal source 50 to apply a relatively large signal voltage to electrodes 52 which do not contact the fluid 20 except at nozzle tip 32. That relatively large signal voltage is added algebraically to the (effectively series-connected) DC target voltage applied at 42 to determine the main electric field between the nozzle and the target. It will be understood that alternatively, but with identical effect, electrodes 52 could be omitted and the modulating signal voltage could be applied to electrodes 40. As a result, the fluid flow will be modulated in accordance with the applied signal voltage at 50.

The nozzle 12 (and especially nib 32) can be a conductor with the modulating signal voltage applied directly to it. Or the nozzle can be an insulator and the modulating signal voltage applied upstream in or on the plenum 18.

In the event that the field between the nozzle and the target is magnetic instead of electric, the magnetic field can be varied to modulate the fluid flow. This accomplishes fluid flow amplitude modulation. For both the magnetic field and the electric field, the just-described modulating signals must be relatively large. Also, if multiple nozzles are used, it is somewhat difficult to independently modulate the multiple fluid flows because each field affects the adjacent field to some extent. Effective isolation between fields is quite difficult to achieve.

Another, and perhaps the most effective, means for modulating the fluid flow rate is "surface pumping". FIGS. 2-4 show the location of upstream electrodes 40 which contact the fluid in channels 30, and downstream electrodes 52 which contact the fluid at the nib 32. The two electrodes 52 need not contact each other. Thus, for each channel 30, one electrode 40 contacts the fluid upstream and one electrode 52 contacts the fluid downstream.

Modulating voltage source 50 feeds different voltage signals to each upstream electrode 40 relative to each downstream electrode 52 to continuously produce varying electric field components parallel to the fluid surface which co-act with the electrical field components normal to the fluid surface produced by the target voltage prior to flight. The resultant of these field components acts to pump the surface of the fluid in a downstream direction in accordance with modulating signal 50, or in an upstream direction if the modulating signal is oppositely signed. Surface pumping requires relatively lower strength signals from modulating voltage source 50 and operates at one nozzle without affecting adjacent nozzles. Surface pumping forces are produced at the surface of the fluid in relation to the voltage differences between electrodes, and the result is the continuous modulation of the fluid flow amplitude between the nozzle nib and the target. The earlier described main field varying form of amplitude modulation can be used in combination with the surface pumping form of amplitude modulation, or either form can be used without the other. Also, multiple electrodes can be used in upstream-downstream alignment to contact the fluid and to cause surface pumping in sequence (i.e. multiple pumping stages).

A third means of modulating the fluid flow amplitude is to modulate the fluid flow to the nozzle by using thermal viscosity modulation. This technique is fully described in Carley, U.S. Pat. No. 3,790,703 issued on Feb. 5, 1974. In order to use this patented Carley technique, a high plenum pressure is required as well as fine capillaries between the plenum and the multiple nozzles.

A fourth means of modulating the amplitude of the fluid flow is to modulate the fluid pressure just upstream of the nozzle. This can be accomplished by using one of the types of transducers 26 which were previously described with regard to pressure regulation. In other words, a transducer can be used to vary fluid pressure instead of being used to maintain fluid pressure constant. This modulating means would be extremely difficult to use in a multi-nozzle system, but could be useful in a single nozzle system.

Yet another means for modulating the amplitude of the fluid flow is to use a magnetic gap assembly as the nib, or to incorporate a magnetic gap internal to the nib. The magnetic flux in the gap is then varied by means of a winding upstream of the nib in the manner of a conventional magnetic gap, such as that used in a magnetic tape recorder. The gap is operated in conjunction with a magnetic fluid, for instance one containing colloidal ferromagnetic particles. If the gap is located coincident with the nib's extreme tip, the fluid is then drawn down the nib by the flux (which is modulated by a signal) and the fluid is thereby fed into the electric field accelerating means.

Bandwidth Enhancement

In order to provide more responsive (quicker) fluid flow modulation control, there are a number of bandwidth enhancement means that can be incorporated into this invention. For example, a means could be located upstream of the nozzle nib to produce traveling wave amplification in conjunction with a multi-stage surface pump. Another bandwidth enhancement means preemphasizes high frequencies and uses drive voltages in excess of the 100% DC voltage dynamic range.

Another bandwidth enhancement means controls the meniscus shape of the fluid at the nozzle tip. This means usually requires at least one additional electrode which is in contact with the fluid flow.

Bandwidth usually deteriorates as fluid flow increases. Therefore, another bandwidth enhancement means is the use of multiple nibs were one nib might otherwise be sufficient. Each of the multiple nibs would carry less fluid flow. In other words, there is the provision of multiple fluid jets per image picture element. Each of the fluid jets carries a fractional part of the total picture element fluid flow.

Another bandwidth enhancement means, especially in an on-off modulating system, is the deflection of the fluid jet in the same direction as the nozzle-target relative motion (or the opposite direction) in such a manner as to anticipate waveform transitions. Although this doesn't actually increase the bandwidth of the flow itself, it has the same effect on the image on the target.

Deflection of the Fluid Jet

The downstream electrodes 52 have a second purpose, in addition to aiding in the surface pumping of the fluid. This second purpose is to facilitate the modulation (i.e. the deflection) of the direction of the original fluid flow from the nozzle to the target. In a symmetrical system, the fluid will flow along the shortest straight path to the target which is along the strong central E-field line.

Deflection modulation in either dimension is accomplished by feeding a first voltage signal between the two upstream electrodes 40 (to control X plane jet deflection), and a second voltage signal between the two downstream electrodes 52 (to control Y plane jet deflection). These electrodes are disposed symmetrically about the nozzle axis and create a variable electric field at the nozzle tip which field is transverse to the fluid flow. There could also be three electrodes disposed symmetrically about the nozzle axis instead of two pairs of electrodes. By this deflection modulation means, the fluid filament can actually be steered in direction from its source point at the nozzle. This feature can be used to enhance gray scale and to suppress the visibility of scan lines.

An alternative means for achieving deflection modulation is the use of conventional ink jet deflectors. An example of this means is incorporating magnetic particles into the fluid, and providing a variable magnetic field gradient transverse to the fluid flow. The field can be varied to deflect the magnetic particle-carrying fluid as it passes through the field.

Another alternative means for achieving deflection modulation is the use of conventional electric field producing plates, external to the nozzle. These plates produce a variable electric field normal to the jet in flight.

Deflection modulation is very useful to the user. It allows the user to address points on a moving or a stationary target. Deflection modulation also has many uses in connection with a raster-scanned image. Examples of such uses include: rapidly wiggling the scan lines by a small amount to reduce their visibility; anticipating waveform transitions to improve image bandwidth; spreading out the scan lines at high fluid flow rates; fine position correcting for sub-micron integrated circuit fabrication; and moving the scan lines slightly, within a picture element, to reproduce additional image information (e.g. to improve perceived sharpness of the resultant image). Computations for these raster-scanned image uses would be done within an image preconditioner 51 which has the appropriate circuitry.

Isolating Adjacent Nozzles and Fluid Jets

It is very important, when employing a multiplicity of nozzles which are located extremely close to each other, that the fluid flow modulating means (including the deflection modulating means) which acts on one nozzle have minimal effect on adjacent nozzles. This requires electrical isolation between nozzles. This isolation requirement is the reason why surface pumping to achieve fluid flow modulation has advantages over main electric field strength variation for fluid flow modulation purposes. It is difficult to vary the nozzle-target electric field at one nozzle without affecting the nozzle-target electric field at the adjacent nozzle. However, when surface pumping is used for fluid flow modulation, the same main field can be shared by all the nozzles.

Any residual interaction between adjacent fluid jets, whether in amplitude or deflection, can be eliminated by signal preconditioner 51 as part of the modulation process. For example, the tendency of the jets to repel electrostatically can be cancelled by deflection modulation. Signal preconditioner 51 can also correct the gray scale "gamma"; can provide high frequency pre-emphasis; can stabilize the jet at low flow rates; and, if feedback is used, can correct for minor nozzle nib defects or nib fouling. The preferred feedback means includes monitoring the electric charge flowing with the jet. This uses only existing electrodes. Alternative feedback means include measuring electrical resistance through the fluid between the nozzle electrodes, or between the electrodes and the target; optically monitoring the jet; or sensing capacitance to determine location or size of the jet or the meniscus.

Interaction between adjacent nozzles can additionally, or alternatively, be suppressed by the use of electrodes between nozzles. These electrodes are preferably located slightly upstream of the nozzle nibs and in contact with the fluid flow. They could also be out of contact with the fluid and located between the nozzles. Such electrodes would carry constant voltage and act as shields against electrical interaction between nozzles, or would carry computed signal voltages generated by the modulating means 50 depending on the requirements of the system.

Information Signal Reception Means

To control the modulating means 50, an information signal reception means 54 is provided in the circuit. The purpose of information signal reception means 54 is to receive and feed a signal to modulating means 50 so that the fluid flow can be continuously varied in amplitude (and optionally in direction by deflection) in order to produce the desired fluid image on the target. The information signal reception means is capable of receiving and feeding signals to the modulating means over the full range of frequencies and amplitudes that the system can achieve. It is intended that the signal reception means accept an information signal of essentially unlimited form or shape. The signal reception means is not limited to the on-off signals that most prior art devices are restricted to.

The modulating means 50 is an electronic circuit for continuously varying the voltage(s) applied to the nozzle electrode(s). In such an arrangement, it may be very helpful to provide a means for sensing (i.e. measuring) the fluid flow amplitude (rate) and for electronically feeding back the sensed data to the fluid flow modulating means 50 for processing and for adjusting the modulating voltges as appropriate. The fluid flow amplitude sensing means can take the form of an optical device, a capacitative sensing device, an ink jet current sensing device, an electrical resistance sensing device, or various other types of sensing devices.

Applications of the Fluid Jet Apparatus

As previously stated, this invention has broad application for many purposes. The following is a brief description of a few applications for illustrative purposes.

This invention can be used as a line at a time printer in which multiple nozzles direct multiple fluid flows onto a moving paper target. The fluid image would be printed text or even art work. The number of jets per picture element could be more than one to reduce the visibility of scan lines or could vary with the gray scale using more jets for darker tones. The information signal would be generated by digital circuitry.

Another use of the invention would be as a silent typewriter. Only about ten to thirty nozzles would be needed to sweep across a stationary paper sheet to deposit a fluid image a letter at a time. The typewriter keys would constitute the basic input mechanism for the information signal reception means and a microprocessor could be part of the system.

Another use of the invention would be as an instant camera or photograph copier which uses plain paper "film". Multiple nozzles would sweep the paper (or vice versa) to deposit a fluid image corresponding to the optical image captured by the camera lens and converted to an information signal(s) by the appropriate electronic imaging system, such as a charge-coupled-device (CCD) camera.

Another use of the invention would be as a facsimile copy (also called a telecopy) receiver in which the transmitter pickup head in one location senses the material to be transmitted over a telephone line and the information signal activates a single nozzle at another location to sweep the plain paper target and to deposit the image thereon.

Another use of the invention would be as an information storage tape unit in which an information signal(s) would activate a nozzle or a plurality of nozzles to deposit fluid flow traces of a very high resolution onto a moving tape. This produces a data density much higher than conventional magnetic or photographic tape or film.

A final example is using the invention to process semiconductor chips to produce integrated circuits. A computer program or other device generating the images for fabricating the integrated circuit can be used to direct a number of nozzles to sweep the resist emulsion as needed to deposit the appropriate fluid image where needed to build the integrated circuit. The fluid would chemically react with the resist to produce the mask when developed. The system has the advantage of producing smaller circuit details because the ink jet can be operated smaller than the wavelength of light.

It will be understood that the scope of this invention is defined only by the appended claims. Obvious modifications of this disclosure are intended to be included within the scope of this invention. The described or illustrated embodiments are for purposes of illustration only.

I claim:

1. Fluid jet apparatus comprising:
   (a) nozzle means having a nib at its downstream tip;
   (b) fluid supply means in communication with said nozzle means for supplying fluid to said nozzle means;
   (c) means for regulating fluid pressure conditions in the fluid at said nozzle means such that substantially no fluid flows from said nozzle nib in the absence of the action of supplemental flow causing means;
   (d) a target spaced from said nozzle means;
   (e) means for producing a field in the region between said nozzle means and said target to initially accelerate the fluid from said nozzle nib and to cause the fluid to thereafter flow in filament-like form to said target, said fluid forming an image on said target;
   (f) means for substantially suppressing breakup into droplets of the filament-like fluid flow;
   (g) means acting on the fluid before it leaves said nozzle nib for modulating the amplitude of the fluid flow; and
   (h) information signal reception means for controlling said modulating means to produce the desired fluid image on said target.

2. Apparatus of claim 1 wherein said fluid supply means includes a large diameter conduit immediately upstream of said nozzle means for minimizing fluid flow resistance.

3. Apparatus of claim 1 wherein said nozzle means includes at least three converging wires forming a hollow open-sided pyramid having a point at its apex, said point being the downstream end of said nozzle means.

4. Apparatus of claim 1 wherein said nozzle means has the form of a solid pyramid.

5. Apparatus of claim 1 wherein the fluid is ink.

6. Apparatus of claim 1 wherein the fluid contains an agent that chemically exposes resist of the type used in the fabrication of integrated circuit semiconductor chips.

7. Apparatus of claim 1 wherein the fluid includes isopropyl alcohol.

8. Apparatus of claim 1 wherein the fluid includes silicone oil.

9. Apparatus of claim 1 wherein the fluid is thixotropic.

10. Apparatus of claim 1 wherein said pressure regulating means maintains the fluid pressure at said nozzle means at less than atmospheric.

11. Apparatus of claim 1 wherein said pressure regulating means maintains the fluid pressure at said nozzle means at no less than atmospheric.

12. Apparatus of claim 1 wherein said pressure regulating means permits the fluid to communicate with the atmosphere upstream of said nozzle means.

13. Apparatus of claim 1 wherein said pressure regulating means includes piezo-electric transducer means.

14. Apparatus of claim 1 wherein said pressure regulating means includes electro-magnetic transducer means.

15. Apparatus of claim 1 wherein said pressure regulating means includes fluidic amplification.

16. Apparatus of claim 1 wherein said target is paper.

17. Apparatus of claim 1 wherein said target is an integrated circuit in the process of fabrication.

18. Apparatus of claim 1 wherein said target is treated with a fluid repellant to reduce image bleeding.

19. Apparatus of claim 1 wherein said target is fabric.

20. Apparatus of claim 1 wherein said target is metal.

21. Apparatus of claim 1 wherein said target is plastic.

22. Apparatus of claim 1 wherein said target is film.

23. Apparatus of claim 1 wherein said target is spaced as close to said nozzle means as is practically possible without the occurrence of electric field distortion.

24. Apparatus of claim 1 wherein said target is spaced as close to said nozzle means as is practically possible without the occurrence of physical contact therebetween.

25. Apparatus of claim 1 wherein said target and said nozzle means move with relation to each other while maintaining their spaced-apart relationship.

26. Apparatus of claim 1 wherein said target and said nozzle means are stationary with respect to each other.

27. Apparatus of claim 1 wherein said target is a relatively good electrical conductor.

28. Apparatus of claim 1 wherein said target is a relatively poor electrical conductor.

29. Apparatus of claim 1 wherein said target is a relatively good insulator.

30. Apparatus of claim 1 wherein there is an absence of any electrodes or other structures between said nozzle means and said target.

31. Apparatus of claim 1 wherein said field is a magnetic field and the fluid has magnetic particles.

32. Apparatus of claim 1 wherein said field producing means includes means for spinning said nozzle about an axis substantially parallel to the tangential plane of said target to create an inertial force field in the region between said nozzle and said target.

33. Apparatus of claim 1 wherein the fluid flow between said nozzle means and said target means has a solid filament form.

34. Apparatus of claim 1 wherein substantially all of the fluid leaving said nozzle means reaches said target means.

35. Apparatus of claim 1 wherein said breakup suppression means includes creating an electric field normal to the surface of the fluid flow at the inception of and in flight which is sufficiently strong to substantially lower the surface tension-induced internal pressure of the fluid flow.

36. Apparatus of claim 1 wherein said breakup suppression means includes providing the fluid with a surface tension which is sufficiently low to permit acceleration of the fluid in filament-like form at the field strength level existing at said nozzle nib.

37. Apparatus of claim 1 wherein said breakup suppression means includes providing the fluid with a surface tension which is sufficiently low to prevent breakup into droplets during fluid flight.

38. Apparatus of claim 1 wherein said breakup suppression means includes reducing the fluid transit time which elapses between the time the fluid leaves said nozzle nib and the time the fluid arrives at said target to a magnitude at which breakup into droplets is prevented.

39. Apparatus of claim 1 wherein said breakup suppression means includes providing said nozzle nib with a downstream point of sufficient fineness that fluid droplets are immediately formed therefrom which have a droplet diameter that is smaller than a size which can be perceived by the human eye in the image on said target.

40. Apparatus of claim 1 wherein said breakup suppression means includes having a least one electrode spaced from said nozzle means, said electrode affecting the electric field to prevent breakup into droplets during fluid flight.

41. Apparatus of claim 1 wherein said breakup suppression means includes incorporating a surface active agent into the fluid.

42. Apparatus of claim 1 wherein said breakup suppression means includes incorporating magnetic particles into the fluid.

43. Apparatus of claim 1 wherein said breakup suppression means includes providing the fluid with a density which is sufficiently high that fluid inertia prevents breakup into droplets during fluid flight.

44. Apparatus of claim 1 wherein said breakup suppression means includes providing the fluid with an electrical conductivity which is sufficiently high to establish substantial electrostatic equilibrium within the fluid, and which is sufficiently low to prevent explosion of the fluid flow.

45. Apparatus of claim 1 wherein said breakup suppression means includes means for directing an air flow parallel to the fluid flow to decrease fluid surface drag and to increase the rate of fluid flow.

46. Apparatus of claim 1 wherein said breakup suppression means includes orienting the fluid flow in a generally downward direction to utilize the force of gravity to increase the velocity of fluid flow.

47. Apparatus of claim 1 wherein the fluid flows to said target in multiple fluid jets per image picture element, each fluid jet carrying a fractional part of the total picture element fluid flow to achieve bandwidth enhancement.

48. Apparatus of claim 1 further having means for permitting more rapid modulation of the fluid flow amplitude to achieve bandwidth enhancement.

49. Apparatus of claim 1 wherein said means for modulating the amplitude of the fluid flow acts to vary the amplitude in a smooth and continuously variable manner.

50. Apparatus of claim 1 wherein said means for modulating the amplitude of the fluid flow causes the amplitude to selectively vary in magnitude from substantially zero to a maximum including all flow rates therebetween.

51. Apparatus of claim 1 wherein said means for modulating the amplitude of the fluid flow responds continuously in frequency from zero to a maximum including all frequencies therebetween.

52. Apparatus of claim 1 wherein said means for modulating the amplitude of the fluid flow causes the fluid image on said target to be produced with a gray scale.

53. Apparatus of claim 1 wherein said target is paper and said information signal reception means is responsive to digital circuitry for printing text whereby computer-type print out images are produced.

54. Apparatus of claim 1 wherein said target is paper, the fluid is ink, and said information signal reception means is responsive to a keyboard system whereby the apparatus functions as a typewriter.

55. Apparatus of claim 1 wherein said target is paper and information signal reception means is responsive to a facsimile copy transmitter pickup head whereby facsimile images are produced.

56. Apparatus of claim 1 wherein said target is a tape and said image corresponds to the information signal, said tape being suitable for playback to reproduce the information signal.

57. Apparatus of claim 1 wherein said target is an integrated circuit semiconductor chip and said information signal reception means is responsive to a computer program for performing a masking step on said chip.

58. Apparatus of claim 1 wherein said fluid flow modulating means includes signal voltage means for continuously varying the amount of surface pumping action applied to the fluid flow.

59. Apparatus of claim 58 wherein said signal voltage means includes a plurality of surface pumping means in sequence with each other.

60. Apparatus of claim 1 further having means for high frequency pre-emphasis to achieve bandwidth enhancement.

61. Apparatus of claim 60 wherein drive voltages momentarily exceed 100% of full range.

62. Apparatus of claim 1 further having means for controlling the meniscus shape of the fluid at said nozzle nib to achieve bandwidth enhancement.

63. Apparatus of claim 62 wherein said meniscus shape controlling means includes at least one additional electrode on said nozzle means which contacts the fluid to achieve bandwidth enhancement.

64. Apparatus of claim 1 wherein said pressure regulating means includes feedback monitoring means for sensing and detecting changes in the fluid pressure and for regulating the pressure in response thereto.

65. Apparatus of claim 64 wherein said feedback monitoring means includes diaphragm means for bounding a portion of said fluid supply means, said diaphragm means moving as the fluid pressure changes, said monitoring means sensing diaphragm position.

66. Apparatus of claim 16 wherein said feedback monitoring means includes electrical capacity-sensing transducer means.

67. Apparatus of claim 1 wherein the fluid flow between said nozzle means and said target means behaves like a solid filament.

68. Apparatus of claim 67 wherein the fluid flow at selected flow rates is initially a solid filament having a diameter of less than approximately 5 microns, and subsequently turns into a series of small, closely spaced droplets having a diameter of less than approximately 4 microns.

69. Apparatus of claim 67 wherein the fluid flow at selected flow rates is a series of closely spaced droplets whose size decreases as the flow rate decreases.

70. Apparatus of claim 67 wherein the fluid flow at selected flow rates is a series of closely spaced droplets whose frequency increases as the flow rate decreases.

71. Apparatus of claim 1 wherein said breakup suppression means includes providing the fluid with a viscosity which is sufficiently high to prevent breakup into droplets during fluid flight, and which is sufficiently low to permit effective modulation of the amplitude of the fluid flow.

72. Apparatus of claim 71 wherein said breakup suppression means includes providing the fluid with thixotropic characteristics.

73. Apparatus of claim 71 wherein said breakup suppression means includes providing the fluid with electroviscous characteristics.

74. Apparatus of claim 71 wherein said breakup suppression means includes means for polymerizing a constituent of the fluid during its flight to said target.

75. Apparatus of claim 71 wherein said breakup suppression means includes means for cooling the fluid during its flight to said target.

76. Apparatus of claim 1 further including means for sensing the magnitude of the fluid flow rate and for electronically feeding back the sensed data to said fluid flow modulating means.

77. Apparatus of claim 76 wherein said sensing means includes optical means.

78. Apparatus of claim 76 wherein said sensing means includes means for sensing electrical capacitance.

79. Apparatus of claim 76 wherein said sensing means includes means for sensing electrical current carried by the fluid jet.

80. Apparatus of claim 76 wherein said sensing means includes means for sensing fluid electrical resistance.

81. Apparatus of claim 1 wherein said target is paper and said information signal reception means is responsive to an electronic camera system whereby still photographic images are produced.

82. Apparatus of claim 81 wherein said still photographic images are produced instantly.

83. Apparatus of claim 82 wherein the electronic camera system is a charge coupled device integral with the apparatus.

84. Apparatus of claim 1 wherein said nozzle nib has a structural point at its downstream terminus.

85. Apparatus of claim 84 wherein said structural point is sharp.

86. Apparatus of claim 84 wherein said nozzle means has associated therewith means for cleaning said structural point.

87. Apparatus of claim 26 wherein said cleaning means is a heating device for incinerating foreign matter off of said point.

88. Apparatus of claim 86 wherein said cleaning means includes monitoring means for detecting the presence of foreign matter at said point and for automatically activating said cleaning means at appropriate times.

89. Apparatus of claim 1 wherein said nozzle means includes a multiplicity of nozzles, each said nozzle having a nib.

90. Apparatus of claim 89 wherein said multiplicity of nozzles are positioned to span said target.

91. Apparatus of claim 89 wherein said nozzles are disposed in a single row.

92. Apparatus of claim 89 wherein said nozzles are disposed in a plurality of rows.

93. Apparatus of claim 89 wherein said nozzles are vertically oriented.

94. Apparatus of claim 89 wherein said pressure regulating means includes means for circulating the fluid upstream of each said nozzle to equalize the fluid pressure in each said nozzle.

95. Apparatus of claim 89 wherein the action of said fluid flow modulating means utilized by one said nozzle has no significant effect on the action of said modulating means utilized by any other said nozzle.

96. Apparatus of claim 89 further having shield electrodes disposed between adjacent nozzles to substantially suppress electrical interaction between said nozzles.

97. Apparatus of claim 89 further having signal bearing electrodes disposed between adjacent nozzles to substantially suppress electrical interaction between said nozzles.

98. Apparatus of claim 89 wherein said information signal reception means includes means for electronically correcting and compensating for electrical interactions between adjacent nozzles.

99. Apparatus of claim 89 wherein said multiple nozzles produce multiple substantially parallel fluid flow streams.

100. Apparatus of claim 99 wherein the number of fluid flow streams varies the gray scale of the image on said target.

101. Apparatus of claim 99 wherein the number of fluid flow stream per image picture element reduces the visibility of scan lines of the image on said target.

102. Apparatus of claim 1 further including means for modulating the deflection of the fluid flow from the direction of its original path.

103. Apparatus of claim 102 wherein said deflection modulation means includes means for creating a variable electric field component normal to the fluid flow in flight.

104. Apparatus of claim 102 wherein said deflection modulation means includes the provision of magnetic particles in the fluid and means for creating a variable magnetic field gradient transverse to the fluid flow.

105. Apparatus of claim 102 wherein said nozzle means includes a multiplicity of nozzles, and wherein the action of said deflection modulating means utilized by one said nozzle has no significant effect on the action of said deflection modulating means utilized by any other said nozzle.

106. Apparatus of claim 102 wherein said deflection modulating means operates over a range of less than one picture element in a raster-scanned system to enhance the perceived sharpness of the resultant image on said target.

107. Apparatus of claim 102 wherein said deflection modulating means deflects the fluid flow in the plane of adjacent nozzle nibs to substantially cancel electrostatic repulsion of adjacent fluid flows.

108. Apparatus of claim 102 wherein said deflection modulating means deflects the fluid flow in a plane which passes through the direction of movement of said target to improve the response time of the apparatus.

109. Apparatus of claim 108 wherein said means for modulating the amplitude of the fluid flow includes means for thermally modifying the viscosity of the fluid flow prior to fluid flight.

110. Apparatus of claim 108 wherein said target moves at high speed and the produced image is alphanumeric information.

111. Apparatus of claim 102 wherein said deflection modulating means includes at least one electrode on said nozzle means, said information signal reception means feeding additional varying signals to said at least one electrode to deflect the fluid flow.

112. Apparatus of claim 111 wherein said at least one electrode contacts the flowing fluid.

113. Apparatus of claim 111 wherein said at least one electrode includes at least one pair of electrodes disposed symmetrically about the nozzle means axis to create a variable electric field at said nozzle nib which field is transverse to the fluid flow.

114. Apparatus of claim 111 wherein said at least one electrode includes three electrodes disposed symmetrically about the nozzle means axis.

115. Apparatus of claim 1 wherein said fluid supply means includes a plenum.

116. Apparatus of claim 115 wherein said pressure regulating means includes a pump.

117. Apparatus of claim 115 wherein said nozzle means is integral with and protrudes from said plenum.

118. Apparatus of claim 117 wherein said plenum includes means for retracting said nozzle means into said plenum.

119. Apparatus of claim 18 wherein said target is treated with an anti-static agent to increase its electrical conductivity.

120. Apparatus of claim 1 wherein said nozzle means has a nozzle, said nozzle having at least one fluid-carrying channel formed on its exterior surface, said channel having its downstream end located at said nozzle nib.

121. Apparatus of claim 120 wherein said channel is free of constrictions and narrow portions to facilitate the passage of foreign matter therethrough.

122. Apparatus of claim 120 wherein the surface chemistry of said channel causes the flow of the fluid to remain therein.

123. Apparatus of claim 120 wherein said nozzle has two fluid carrying channels formed on its exterior surface, said two channels being located on opposite sides of said nozzle, both said channels becoming narrower and shallower and converging as they approach and reach said nozzle nib.

124. Apparatus of claim 120 wherein said channel is substantially flat.

125. Apparatus of claim 124 wherein said substantially flat channel is an etched surface along a crystallographic plane of a crystalline material.

126. Apparatus of claim 120 wherein different fluids are carried by said channels.

127. Apparatus of claim 126 wherein the different fluids merge at said nozzle nib and thereafter flow to said target as a single filament.

128. Apparatus of claim 126 wherein one of the different fluids creates no fluid image on said target.

129. Apparatus of claim 126 wherein the different fluids are different colored inks for creating a multi-colored fluid image on said target.

130. Apparatus of claim 129 wherein said nozzle means includes two rows of said nozzles, each row having channels carrying two different colored inks to produce four color process color printing.

131. Apparatus of claim 1 wherein said field is an electric field.

132. Apparatus of claim 131 wherein said fluid flow modulating means includes signal voltage means for continuously varying the strength of said electric field in the region between said nozzle means and said target.

133. Apparatus of claim 132 further including a DC voltage source, said signal voltage means being effectively in series with said DC voltage source.

134. Apparatus of claim 131 wherein said electric field producing means includes a circuit containing at least one electrode on said nozzle means for electrically charging the fluid as it flows over said electrode, a voltage source for said at least one electrode, and a means for electrically charging said target with a charge opposite that of the fluid, said field producing means thereby creating an electric field in the region between said nozzle means and said target.

135. Apparatus of claim 134 wherein said voltage source has a selected DC magnitude such that substantially no fluid will flow from said nozzle means to said target without the impression of additional voltage.

136. Apparatus of claim 134 wherein said nozzle means has at least one exterior fluid-carrying channel, at least one of said channels having an electrode contacting the fluid flowing in said channel.

137. Apparatus of claim 134 wherein said means for charging said target is a corona discharge device.

138. Apparatus of claim 134 wherein said means for producing an electrical field includes an electrode located on the side of said target opposite that of said nozzle means.

139. Apparatus of claim 134 wherein said target means is paper, said means for charging said paper is a corona discharge device, and said paper target is charged negatively relative to the fluid in said nozzle means.

140. Apparatus of claim 134 wherein the fluid flow has a terminal velocity in the range of 5 to 15 meters per second.

141. Apparatus of claim 134 wherein said means for charging said target is a direct electrical contact device.

142. Apparatus of claim 141 wherein said direct electrical contact device is a wire brush.

143. Apparatus of claim 134 wherein said nozzle means has a plurality of electrodes for charging and surface pumping the fluid flowing from said nozzle means, and signal voltage means for varying the signals to said electrodes to modulate the fluid flow.

144. Apparatus of claim 143 wherein said signal voltage means also modulates the electric field strength in the region between said nozzle means and said target.

145. Apparatus of claim 143 further having means located upstream of said nozzle tip for traveling wave amplification to achieve bandwidth enhancement.

146. Apparatus of claim 143 wherein all of said plurality of electrodes are located on said nozzle means in positions in which they contact the fluid flow.

147. Apparatus of claim 146 wherein at least one of said electrodes is located upstream of at least one other of said electrodes relative to said nozzle tip.

148. Apparatus of claim 147 wherein the voltage between said upstream and said downstream electrodes creates an electric field component parallel to the surface of the flowing fluid prior to flight and the voltage between said target and the surface of the fluid prior to flight creating electric field components normal to the surface of the flowing fluid, the fluid being surface pumped relative to said target by the resultant electric field components.

149. Apparatus of claim 148 wherein said surface pumping is bi-directional and modulates fluid flow in response to said signal means.

* * * * *